United States Patent
Blatt et al.

(10) Patent No.: US 6,435,224 B2
(45) Date of Patent: Aug. 20, 2002

(54) AUTOMATIC REFILL SYSTEM FOR ULTRA PURE OR CONTAMINATION SENSITIVE CHEMICALS

(75) Inventors: Christopher S. Blatt, San Diego, CA (US); Richard H. Pearce, Cocoa, FL (US); Graham Williams, Bromborough (GB); Edward H. Wentworth, III, Gold Canyon, AZ (US)

(73) Assignee: Arch Specialty Chemicals, Inc., Norwalk, CT (US)

( * ) Notice: Subject to any disclaimer, the term of this patent is extended or adjusted under 35 U.S.C. 154(b) by 0 days.

(21) Appl. No.: 09/921,452

(22) Filed: Aug. 2, 2001

Related U.S. Application Data

(60) Provisional application No. 60/223,052, filed on Aug. 4, 2000.

(51) Int. Cl.[7] .............................................. F17C 13/00
(52) U.S. Cl. ................................ 141/21; 141/5; 141/1; 141/67; 141/95; 141/198; 137/209
(58) Field of Search .............................. 141/1, 5, 6, 18, 141/21, 48, 63, 67, 95, 198; 137/208, 209, 412, 413

(56) References Cited

U.S. PATENT DOCUMENTS

| | | | |
|---|---|---|---|
| 4,909,436 A | * | 3/1990 | Hamner et al. ............ 236/44 A |
| 4,979,545 A | | 12/1990 | Fair |
| 5,038,840 A | | 8/1991 | Fair |
| 5,069,244 A | | 12/1991 | Miyasaki et al. |
| 5,279,338 A | | 1/1994 | Goossens |
| 5,316,181 A | | 5/1994 | Burch |
| 5,330,072 A | | 7/1994 | Ferri, Jr. et al. |
| 5,465,766 A | | 11/1995 | Siegele et al. |
| 5,485,941 A | | 1/1996 | Guyomard et al. |
| 5,490,611 A | | 2/1996 | Bernosky et al. |
| 5,549,142 A | | 8/1996 | Beale |
| 5,551,309 A | | 9/1996 | Goossens et al. |
| 5,562,132 A | | 10/1996 | Siegele et al. |
| 5,590,695 A | | 1/1997 | Siegele et al. |
| 5,607,002 A | | 3/1997 | Siegele et al. |
| 5,609,191 A | | 3/1997 | Topping et al. |
| 5,711,354 A | | 1/1998 | Siegele et al. |
| 5,878,793 A | | 3/1999 | Siegele et al. |
| 5,950,693 A | | 9/1999 | Noah et al. |
| 5,964,254 A | | 10/1999 | Jackson |

* cited by examiner

Primary Examiner—J. Casimer Jacyna
(74) Attorney, Agent, or Firm—Ohlandt, Greeley, Ruggiero & Perle, LLP

(57) ABSTRACT

A highly reliable and safe, modular automatic refill (bulk delivery) system for ultra-high purity pyrophoric metalorganic chemicals employing: a manifold that insures contamination-free operation; a liquid-level detection system with fail-safe redundancy; and an evacuation system which leaves the system's manifold and transfer lines relatively free of chemical fire hazards; leaves them free of oxygen contamination; and leaves the composition of the system's carrier gas unaffected, between refills.

19 Claims, 3 Drawing Sheets

AUTOMATIC REFILL SYSTEM FOR ULTRA PURE OR CONTAMINATION SENSITIVE CHEMICALS

This application claims priority from Provisional application Ser. No. 60/223,052, filed Aug. 4, 2000.

BACKGROUND OF THE INVENTION

1. Field of the Invention

The present invention relates to a system for supplying ultra pure and contamination sensitive chemicals to production lines for forming semiconductors, fiber optics, or like components. More particularly, this invention relates to a system carrying pyrophoric chemicals which allows the production line to operate continuously, and without interruption.

2. Description of Related Art

The manufacture of semiconductors, fiber optics, and the like components, typically requires production lines with systems for supplying high purity processing chemicals to diffusion furnaces, either directly or in carrier gases. Processing chemicals are liquids which may be directly injected into the processing stations, or which may be carried to the processing stations in a carrier gas. Direct chemical injection may be from bulk supply tanks, or may be from smaller supply containers which will be periodically refilled by bulk supply tanks. When the chemicals are applied by means of carrier gases, the liquid chemicals will be contained in temperature-controlled ampules or work cylinders, called "bubblers". A stream of an inert carrier gas, such as nitrogen, helium, or the like, is injected into the bubbler ampules. The inert carrier gas bubbles upwardly through the liquid chemical in the bubbler ampule and creates a chemical-saturated carrier gas atmosphere in the ampule in the space above the supply of liquid chemical contained therein. The chemically saturated carrier gas is continuously drawn out of the bubbler and transferred into the component processing station, such as a diffusion furnace, as noted above.

The processing lines depend on a continuous supply of the chemicals being delivered from the chemical source in order to operate properly and efficiently. If the supply of the processing chemicals is interrupted, the production line must be shut down, and the diffusion furnace must be placed in a "idle" mode. If the chemical ampules are depleted of processing chemicals, they must be removed from the production line and replaced with freshly filled ampules.

To avoid the necessity of removing a bubbler ampule from the production line, additional bulk chemical supply containers may be incorporated into the production line. When a single bulk supply container is used in the production line, it must be periodically refilled with processing chemicals. The line must be shut down while the bulk supply container is refilled. The line can be run for a longer time period due to the use of the bulk supply container, however, the line still must be periodically shut down when the bulk supply container is depleted. When two bulk supply containers are used, one is a fixed container and the other is a replaceable mobile container. The ampule is replenished with chemicals from the fixed bulk container, and the fixed bulk container is refilled with chemicals from the replaceable, or shuttle, bulk container. The fixed bulk container is typically positioned on a scale or connected to a load cell so that the volume of chemical in the fixed bulk container is continuously monitored. Signals are transmitted to the system microprocessor controller or "junction box" which are indicative of the volume of chemical remaining in the fixed bulk container. The microprocessor controller manages about 2 points of use. For each point of use, there are four level sensors, i.e., empty, low, high or overflow. The low or high corresponds to the "start" and "stop" sensors which trigger the signal initiation to fill the ampule or the removal of the request. The empty or overflow ("overfill") sensors are emergency sensors if the start and stop sensors fail. The supply voltage for the sensor circuit is about +24 volts. All level sensors connect to +24 volt when dry. A pressure switch generates a junction box alarm when there is not enough clean dry air (CDA) pressure. The electrical connections include main power and interface connections. Power is configured for 110 VAC or 230 VAC. A circuit breaker located where the main power is connected can be used to shut off all power to the unit. Twin fans act to cool the electronics area of the unit. A dispense request connector is used to interface with the process equipment, in addition to supplying status and alarm signals.

Typically, when the fixed bulk container is seen to be 75% full, the controller activates a chemical transfer valve system which transfers chemical from the shuttle bulk container to the fixed bulk container, and when the fixed bulk container has been refilled, the controller deactivates the chemical transfer valve system. Thus, the fixed bulk supply container will be refilled several times before the shuttle supply container must be refilled. When the shuttle bulk supply container has been substantially emptied, the shuttle container is removed from the production line and is refilled at an off-site chemical supply repository, which is typically far removed from the processing plant.

The use of fixed and shuttle bulk chemical supply containers has proven to be functionally operative, but it would be desirable to be able to provide an alternative replenishment system for the chemical ampules; and even more desirable to provide a chemical replenishment system with a controller microprocessor which can operate the system in alternative chemical replenishment modes, one having a fixed and a replaceable bulk chemical supply containers, and the other having two replaceable bulk chemical supply containers.

Transportation of ultra high purity or ultra sensitive chemicals within the production lines require additional safeguards. For that reason, pyrophoric chemicals capable of self-ignition when it is exposed to air, are rarely in production lines. Automatic liquid replacement or refill systems for liquids have been utilized in other industries where the purity requirements of the liquid are far less stringent, and where pyrophoric reactions and extreme air (oxygen and moisture) sensitivity are not commonly encountered. Moreover, these replacement systems have been based upon measuring the weight of the liquid in the working container at comparative points in time or by using a time filling sequence to ensure the proper volumetric quantity is delivered. None of the systems were designed to work with the stringent requirements needed for ultra high purity or contamination sensitive chemicals in the compound semiconductor industry, and where the systems must accommodate pyrophoric metalorganic chemicals with their need to minimize fire, and eliminate air contamination hazards.

Additionally, automatic chemical refill systems servicing a multiple number of temperature controllers and their bubblers from one central refill control system have suffered from the problem that when one temperature controller has experienced problems or malfunctions in the system, all of the refill lines have to be shutdown until the problem is corrected. In current practice, most chemical refill systems are capable of operating up to four temperature controllers concurrently to supply vapors to a corresponding number of deposition tools. Thus, a repair required of just one temperature controller in the refill system could cause all of the temperature controllers in the system to be shutdown.

The bubblers are held in liquid, temperature-controlled baths, and must be periodically replaced based on the usage of the ultra high purity pyrophoric metalorganic (PMO) source chemical. The amount of chemical used is a function of the degree of saturation of the hydrogen carrier gas carrying the PMO chemical to the metalorganic chemical vapor deposition (MOCVD) reactor and the quantity of carrier gas used. Typical carrier gases are nitrogen, argon, or helium, but the preferred gas for PMO CVD is ultra high purity hydrogen. Some typical chemicals utilized in bubblers are trimethylgallium (TMG), triethylgallium (TEG), trimethylaluminum (TMA) and dopant chemicals, such as dimethylzinc (DMZ) and diethylzinc (DEZ). When the chemical in the bubbler is depleted, the bubbler has to be removed from the temperature bath and refilled at a remote site.

In the typical compound semiconductor prior art process which requires use of fresh liquid pyrophoric metalorganic (PMO) chemicals, a replacement bubbler is inserted into the liquid temperature bath. This replacement of the chemical, however, requires physical removal of the depleted bubbler from the liquid temperature bath and requires the MOCVD machine to be shut down for a period of time while the change is being made. Normally the MOCVD machine's reactor zone temperature is lowered during these periods of non-operation. Prior to recommencing use of the replenished chemical, both the bubbler and the machine's reactor zone must be reheated to their standard operating temperatures. Routinely, test samples are next run through the process to ensure that the replenished chemical is not contaminated, and that it is otherwise acceptable for use in the process, prior to resuming the production operation. The total, liquid chemical replacement process can take from two to eight hours, depending upon the chemical involved and the end product being made by the MOCVD machine.

These problems are solved in the design of the present refill system by providing a modular automatic refill system where the liquid level sensors operate completely independent from each other to automatically refill the bubbler in its liquid temperature bath without removing the bubbler from the bath.

This invention relates generally to a system to automatically refill a liquid from a bulk container to a smaller receiving container without contamination. More specifically, it relates to a modular system providing fresh liquid pyrophoric metalorganic (PMO) chemicals through an automatic refill to a plurality of working cylinders (in their corresponding temperature controlled baths) that supply a vapor to a corresponding number of metalorganic chemical vapor deposition (MOCVD) machines. Source liquid chemical cylinders have been utilized in the compound semiconductor industry to supply chemicals directly or indirectly via carrier gases that are either partially or fully saturated with the particular PMO chemical as a function of the liquid chemical cylinder's temperature and pressure and the rate of carrier gas flow through the cylinder. Various ultra-high purity liquid PMO chemicals, including those commonly called dopants, are required for this industry.

Additionally, in conventional MOCVD reactors, it is common practice to use a vacuum pump to remove residual PMO vapors from transfer lines, before removing a cylinder or bubbler, to replace it, or to inspect it. The use of a vacuum pump has several disadvantages:

A vacuum pump requires that a trap be used to condense and thereby remove volatile chemicals before they reach the pump, in order to avoid corrosion and decomposition of the chemicals with formation of deposits on the working surfaces and moving parts of the pump.

A vacuum pump generates heat, which can interfere with temperature control of the system.

A vacuum pump, and attendant parts, supports and trap, requires space in the working area.

A vacuum pump is an expensive piece of equipment, which requires regular maintenance. Its trap requires regular inspection, replacement of low-temperature coolant, and regular removal of and disposal of the condensed, hazardous PMO chemicals. In addition, the vacuum pump requires regular changes of its sump oil due to the build-up of PMO's in the oil, in spite of the aforementioned trap, which is never 100% efficient.

The use of the venturi for the present invention is not only unique, but often overlooked. This is due to the fact that under normal conditions, the vacuum that can be generated by the venturi is not sufficient to evaluate all of the pyrophoric chemicals so one could safely open the system for a container exchange. Thus, based on theoretical calculations, this type of a system would not work. However, the present inventors have incorporated the use of the venturi with a dilution/purge routine that surprisingly allows for all of the chemical to be removed from the system. Thus, a safe container exchange is possible. This avoids the conventional use of vacuum pumps or other such expensive equipment to achieve the desired vacuum.

The disadvantages of using a vacuum pump are overcome in the present invention by the forementioned use of a venturi to remove residual PMO chemical vapors. The use of a venturi for the removal of residual PMO vapors has several advantages:

A venturi requires no moving parts for its operation, and therefore does not require a trap be installed to remove volatile chemicals before they reach the venturi. The volatile chemicals treated by the venturi in this invention are exhausted directly through the venturi and are combined for disposal with the normal exhaust from the MOCVD tool.

A venturi generates little or no heat, and therefore has no effect on the temperature control system of this invention.

A venturi requires very little space within the system's cabinet. A venturi's small size allows further efficiency by reducing the volume of gases contained in shorter lengths of connecting lines.

A venturi is a very simple device, is inexpensive to install, and requires little or no maintenance.

SUMMARY OF THE INVENTION

The present invention is directed to a chemical refill system which comprises: (a) at least one first chemical reservoir; (b) at least one second chemical reservoir; (c) a means for supplying gas to the chemical refill system; (d) a conduit means for connecting the means for supplying gas, the first chemical reservoir, and the second chemical reservoir; (e) at least one venturi comprising a gas inlet, a gas outlet and an exhaust gas outlet, the venturi being disposed between the means for supplying gas and the first and second reservoirs; and (f) at least one valve disposed about the exhaust outlet, wherein the valve prevents diffusion of oxygen or any contaminants into the system. Preferably, the first chemical reservoir is a bulk chemical supply tank and the second chemical reservoir is an ampule and receives chemical from said first chemical reservoir and delivers chemical to a means for applying the chemical. The conduit means connects the chemical refill system to a means for applying the chemical and comprises a plurality of transfer lines and a plurality of valves.

One embodiment of the chemical refill system further comprises a volume sensor which is capable of monitoring the volume of chemicals remaining in the first and second chemical reservoir. The volume sensor is operable to monitor the volume of chemical in the first and second chemical reservoirs using one selected from the group consisting of: optical sensor, thermal conductance sensor, capacitance sensor, weight scale, sonic sensor, weight scale, and nitrogen back pressure sensor. Preferably, the volume sensor is an optical sensor utilizing a glass rod encased in the first and second chemical reservoirs or a thermal conductance sensor utilizing a thermistor encased in the first and second chemical reservoirs.

Another embodiment of the chemical refill system further comprises a liquid temperature sensor in each of the first and second chemical reservoirs. A further embodiment of the chemical refill system comprises a microprocessor controller means for selectively operating the chemical refill system. Preferably, the microprocessor controller means is a programmable logic controller. Also preferably, the microprocessor controller means further comprises a set of solenoid valves.

One embodiment of the chemical refill system comprises two of the first chemical reservoir and two of the second chemical reservoir. The chemical refill system for this embodiment has a microprocessor controller means which selectively operates the system in a fixed/shuttle mode which mode involves the use of a fixed first chemical reservoir and the use of a shuttle first chemical reservoir, or in a shuttle/shuttle mode which mode involves the use of a plurality of shuttle first chemical reservoirs.

The present invention is also directed to a process for transporting a chemical: (a) using a chemical refill system further comprising a microprocessor controller means which comprises a plurality of independently operating microprocessor-controlled modules, each module being matched electrically to each first chemical reservoir, and programmed to control the refilling operation of said corresponding first chemical reservoir; (b) monitoring the volume of chemical within said corresponding first chemical reservoir; wherein each independently operating microprocessor-controlled module may be removed from the microprocessor controller without interrupting the operation of the remaining microprocessor-controlled modules and their corresponding first chemical reservoirs and wherein each microprocessor-controlled module; (c) sensing an alarm condition from a volume sensor; and (d) causing through the sensing of step (c) either a refill of that working reservoir or a shut down of that automatic refill line, and wherein all microprocessor-controlled modules, upon sensing a low level or low pressure alarm condition from said sensor in the first chemical reservoir, will act synchronously to cease operation from that first chemical reservoir.

Another embodiment of the invention further comprises at least two check valves, wherein the check valves control the conduit means between each of said first chemical reservoir.

In a further embodiment of the invention, the chemical refill system transports pyrophoric chemicals. Preferably, the chemical refill system transports liquid pyrophoric metalorganic chemicals.

DETAILED DESCRIPTION OF THE INVENTION

Figure 1:
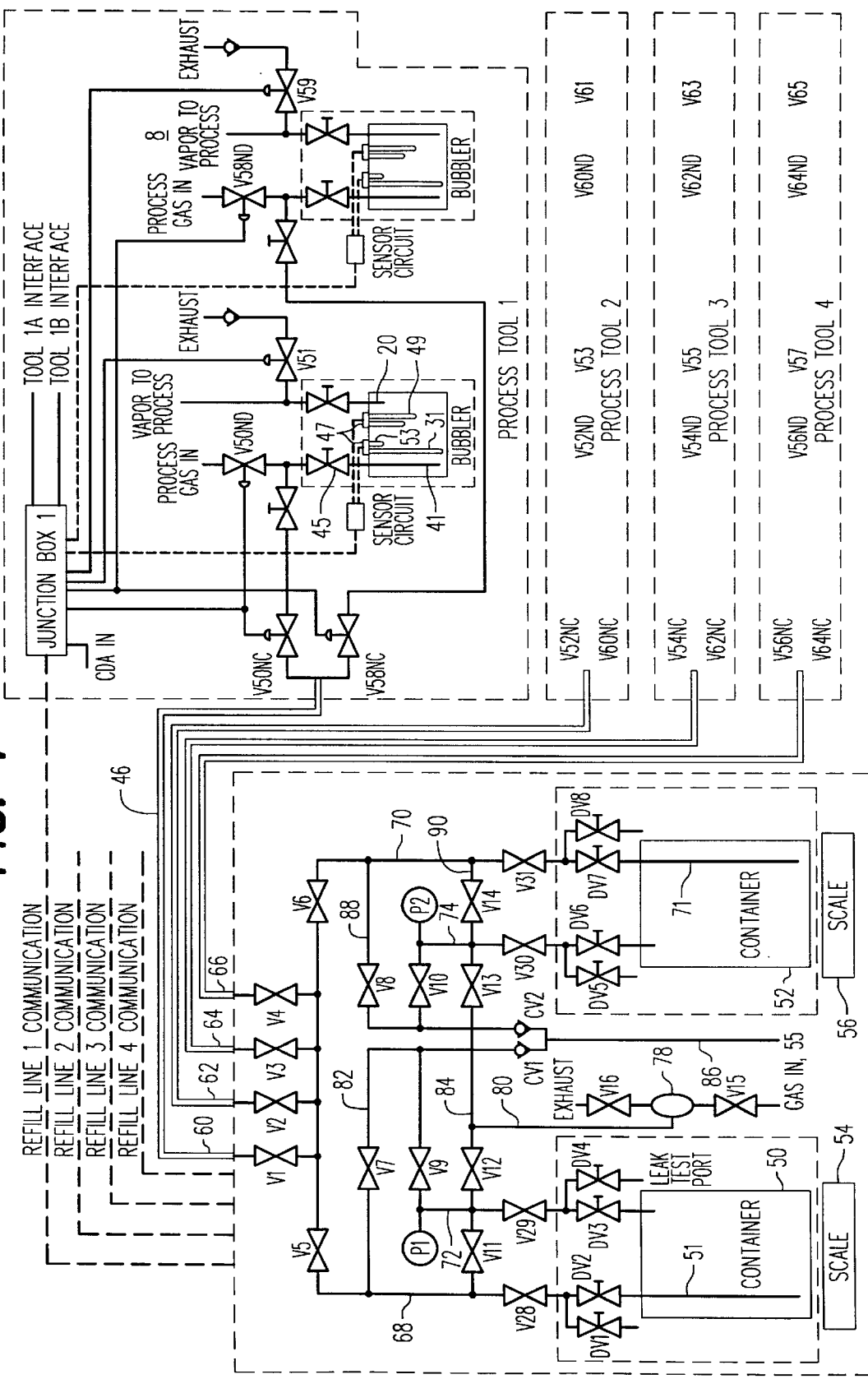
FIG. 1 is a schematic view of the system of the present invention for dispensing ultra high purity or contamination sensitive chemicals into a processing station in the production line having eight points of use in the bubbler section.

FIG. 1 is a schematic view of an ultra pure or contamination sensitive chemical dispensing system which forms a part of a production line for processing semiconductors, or the like. The left side of FIG. 1 shows the bulk chemical supply tanks and the valving and conduit scheme for the purge gas and chemical refill manifold. The bulk chemical supply tanks are denoted by the numerals 50 and 52. One or both of them can be shuttle tanks. When only one tank is a shuttle tank, the other will be a fixed tank which is not designed to be removed from the cabinet 48. In either case, the cabinet 48 will be provided with scales 54 and 56, one for each of the tanks 50 and 52. The cabinet assembly is thus capable of being used in a shuttle/shuttle mode, and is also capable of being used in a fixed/shuttle mode. The scales 54 and 56 monitor the amount of chemical which remains in each tank 50 and 52 at all times, and are operable to send appropriate signals to the controller so that the shuttle tank can be removed and replaced with a new shuttle tank in a manner which allows the production line to remain in continuous operation for an indeterminate time period.

The manifold includes a plurality of outlet passages 60, 62, 64, and 66 which are connected to individual bubblers or ampules. The outlet passages are each provided with individual control valves V1, V2, V3, and V4, respectively, which are actuated by the system controller so that the chemical from the tanks 50 and 52 may be selectively transferred to bubblers which require chemical replenishment. Transfer passages 68 and 70 are operable to transfer chemical from the tanks 50 and 52, respectively, to the outlet passages 60, 62, 64, and 66. Each of the transfer passages 68 and 70 is provided with respective valves V5 and V6 which are operable to control chemical flow from the tanks 50 and 52. Valves V5 and V6 are also actuated by the system controller. The chemical is forced out of tanks 50 and 52 by means of a tank-pressurizing gas source 55. Pressure gauges P1 and P2 are used to monitor the gas pressure in the tanks 50 and 52, respectively. The gas source is operable to selectively provide a pressurized stream of an inert dry gas, such as helium or nitrogen, to tanks 50 and 52 through passages 72 and 74. The flow of pressurizing gas to tanks 50 and 52 through passages 72 and 74 is controlled in part by valves DV3 and DV6; and the transfer of chemicals from tanks 50 and 52 to passages 68 and 70 is controlled in part by valves DV2 and DV7, respectively. Valves DV2, DV3, DV6 and DV7 are manually operated, and are kept open during normal system operation. Valves DV1, DV4, DV5 and DV8 are leak test ports.

A second source of pressurized gas is included in the system for use in applying a vacuum to the manifold assembly. The pressurized gas source opens into a line which is controlled by valve V15 and when valve V15 is open, the gas stream passes through venturi nozzle 78 so as to impose a vacuum in line 80 which opens into venturi nozzle 78. The venturi pulls vacuum on the manifold so that there is no need to connect the system to an external supply of vacuum. An additional valve V16 is located at the exit of the venturi. Valve V16 prevents back diffusion of oxygen or any moisture or air that may be detrimental to ultra pure or contamination sensitive chemicals.

The following is a description of the valving sequence for transferring chemical from tank 50 to one or more of outlet passages 60, 62, 64 or 66. It will be understood that the chemical can be similarly transferred from tank 52 to outlet passages 60, 62, 64, or 66 in the event that the system is used in the shuttle-shuttle mode, by manipulating the corresponding valves. As previously noted, valves DV2 and DV3 are kept open during normal operation of the system. One or more of valves V1, V2, V3 or V4 will be opened along with valves V5 and V9. Valves CV1 and CV2 are check valves which prevent back flow of gas into the gas source. All of the remaining valves except for DV6 and DV7 will be closed. Opening valve V9 allows the pressurizing gas from the gas source to enter tank 50, pressurizing the latter sufficiently to force the chemicals up through tube 51 into line 68 and out through the opened outlet passages. The chemical is transferred to bubbler ampule 4 through a line 46 which connects with an extended tube 41 via a valve 45 which remains open at all times during normal operation of the system. The transferred chemicals enter ampule 4 through the open end of tube 41. When the appropriate fill level is detected in the ampule, the controller automatically closes valves V5 and V9 along with the opened outlet valve. As previously noted, scale 54 monitors the amount of chemicals remaining in tank 50, and when the chemical amount reaches a predetermined minimal amount, the controller will provide a signal to the system operator that the tank is to be removed from the cabinet when the system is a shuttle/shuttle system.

When the system is operating in a fixed/shuttle mode such that tank 50 is the fixed tank and tank 52 is the shuttle tank, scale 54 will signal the controller when the chemical level in tank 50 has reached a refill level, preferably about 75% of capacity, and the controller will open the correct valves in the system so as to effect a transfer of chemical from tank 52 to tank 50. Assuming at this point that all of the valves except DV2, DV3, DV6, and DV7 are closed, the controller will open valves V10, V5, and V6. This will cause the pressurized gas from the gas source to pressurize the tank 52 to the extent needed to force the chemical up through tube 71 into passage 70 and through the valves V5 and V6 to line 68. The chemical then flows down through line 68 into tube 51 and into tank 50. When scale 54 signals that sufficient chemical has been transferred into tank 52, the controller closes valves V10, V5, and V6 to halt movement of the chemical from tank 52 to 50. Obviously, if tank 52 were the fixed tank and tank 50 were the shuttle tank in a fixed-shuttle system, the transfer would involve manipulation of valve V9 rather than valve V10. The other operative valves would remain the same.

The microprocessor controller when operating the system in the shuttle/shuttle mode, periodically actuates the valves to open one of the second and third chemical transfer lines upon receipt of the need-to-add level of chemical signal from the level detectors and, after receipt of a tank-empty signal from one of the volume sensors, to periodically subsequently actuate the valves to open the other of the second and third chemical transfer lines upon receipt of subsequent need-to-add level of chemical signals from the level detectors, and to keep the valves in a condition which holds the first chemical transfer line in a closed condition.

In both the fixed/shuttle and shuttle/shuttle modes of operation, there will be an operating protocol for exchanging an empty tank for a full tank. The following is an explanation of the protocol. The empty tank to be replaced will be the shuttle tank in the fixed/shuttle mode, and alternating ones of the tanks in the shuttle/shuttle mode. Assuming that tank 52 is the tank to be replaced with a full tank, the controller will be signaled by scale 56 that tank 52 is empty, i.e., that the chemical level is below the lower end of tube 71.

The general protocol for exchanging empty bulk containers is as follows:

1) blowing out the lines of the manifold associated with the bulk container being replaced;
2) purging the lines of the manifold associated with the bulk container being replaced;
3) flushing inert gas through the connection lines while they are being disconnected from the empty bulk container and then reconnected to the new bulk container;
4) purging the lines again; and
5) checking the connections for leaks.

"Blowing out" refers to the removal of liquid in lines of the manifold when the latter are full of chemical. "Purging" refers to the removal of any residual liquid remaining in the lines after the "blowing out" operation. "Flushing" refers to the constant flow of gas through the lines to eliminate line contamination which connections are being made.

To start the changeover sequence, the controller will open valve V15 so as to direct a stream of compressed gas through venturi 78 and out through valve V16. This will draw a vacuum in the line 80 and in line 84. The valve V13 is opened to extend the vacuum to tank 52. Valve V8 is opened to direct a stream of pressurized gas from the gas source 55 into lines 86, 88, and 70. The gas stream from source 55 thus sweeps through lines 88 and 70 as well as tube 71 and tank 52, and thence through lines 84 and 80, into venturi 78, and through valve V16. The valve V16 prevents back diffusion of oxygen or any moisture or air which is detrimental to ultra pure or contamination sensitive chemicals. The dry gas from the gas source will cause any residual chemical in lines 88 and 70 to be transferred into tank 52. The aforesaid valving condition will be maintained for a predetermined time period needed to purge the lines of residual chemical. After the lines have been purged of residual chemical, all automatic valves are closed and the system operator is instructed to close manual valves DV6 and DV7 on top of tank 52.

After the system operator signals the system controller that the valves have been closed, the controller will open valve V15 so as to direct a stream of compressed gas through venturi 78 and out through valve V16. This will draw a vacuum in line 80 and in line 84. Valves V13 and V14 are opened to extend the vacuum to lines 74, 90, 70, and 88, and on tank valves DV6 and DV7. The aforesaid valving condition will be maintained to apply vacuum to the lines and on the tank valves for a predetermined time period. Next, valves V15 and V13 are closed and the valve V8 is opened to direct a stream of pressurized gas from gas source 55 into lines 86, 88, 70, 90, and 74. The gas stream from source 55 thus applies pressure to lines 88, 70, 90, and 74 as well as on tank valves DV6 and DV7 for a predetermined time period.

The above purge cycle of alternately applying vacuum and pressure on the lines and on the tank valves is repeated for the desired number of cycles, typically about ten. Once the necessary purge cycles have been completed, all automatic valves are closed and the controller will open valves V8 and V10 to allow gas to flow through lines 70 and 74 while the tank is being replaced. The aforesaid prevents air from entering the flexible connection lines while the tank is being removed and a new tank is being installed. The system operator will be instructed to remove tank 52 from the cabinet and to install a full replacement tank. After the system operator has indicated that a new tank has been installed valves V8 and V10 are closed. The controller then opens valve V15 so as to direct a stream of compressed gas through venturi 78 and out valve V16. This will draw a vacuum in the lines 80 and 84. Valves V13 and V14 are opened to extend the vacuum to lines 74, 90, 70, 88, and to tank valves DV6 and DV7. After sufficient vacuum time, the controller closes valves V13 and V15. The controller then monitors the pressure on the lines and valves DV6 and DV7 by means of pressure gauge P2, which is a pressure transducer, as is pressure gauge P1. A rise in pressure would indicate a leak in the connections to the new tank. If no leaks are detected, the system repeats the above purge cycles and returns. The operator will manually return the system to automatic operation, which will operate as outlined above.

It is noted that the replacement/purge procedure will occur when an empty tank is replaced with a full tank, irrespective of whether the system is operating in the fixed/shuttle, or the shuttle/shuttle mode. In order to operate the system controller in the preprogrammed operating mode, i.e., either the fixed/shuttle, or the shuttle/shuttle operating mode, the system operator need only activate the controller to reassume automatic operation of the system, which is accomplished by means of the keyboard provided in the system.

The dispensing system includes a chemical temperature controller which contains a chemical supply ampule 4 from which the ultra pure or contamination sensitive chemical is fed into a semiconductor-processing station via conduit. In the system, the chemical is carried into the processing station in a stream of an inert gas such as nitrogen. The nitrogen gas stream is fed into chemical supply ampule 4 from a line which opens into a tube 41 that extends below the surface of the chemical in ampule 4. The nitrogen gas stream forms an ascending flow of bubbles which rises up through the liquid chemical into the free space in ampule 4, and is operative to humidify and pressurize the free space, and create a pressurized, chemically-humidified stream of processing gas which flows out of ampule 4 through outlet 20 and into a line to the processing station. A branch line may be used to temporarily exhaust the processing gas stream from the system during start-up of the process. Valves are selectively operable to control the direction of flow of the processing gas stream. The composition of the atmosphere in the processing station is controlled by gases admitted into the processing station via lines which are regulated by gas mass flow controllers.

The temperature controller includes a heater which maintains the liquid chemical in ampule 4 at a proper operating temperature. A chemical temperature connected to temperature controller via electrical line sensor and chemical level sensor array are disposed in ampule 4.

The level of the chemical in ampule 4 is sensed in a manner which depends upon the material from which ampule 4 is constructed. For example, when a quartz ampule is used, the level sensing is done by means of a beam emitter and vertically spaced-apart receivers which are located in the portion of the bubbler where ampule 4 is situated. One of the receivers is a start-refill receiver. The emitter sends a signal beam through the quartz ampule to respective receivers located on the opposite side of the ampule. When the liquid level is such that the emitter signal passes through the liquid, the index of refraction of the liquid causes the emitter beam to bend sufficiently so that the start-refill receiver will not "see" the emitter beam. So long as this condition persists, the ampule refill program will not be activated. When the liquid level falls below the emitter signal beam path, the start-refill receiver will sense the signal beam and will transmit a start-refill program-activation signal to the system controller.

In order to ensure that the proper amount of chemical has been added to the ampule during the refill operation, at least one liquid level sensor is provided in the system. The sensors are vertically spaced apart at a predetermined distance. The lowest sensor is the "start refill" sensor. The intermediate sensor is a "stop refill" sensor, and the uppermost sensor is an "overfill" sensor. The stop refill sensor is operable to send a signal to the system controller indicating that the ampule has been properly refilled; and the overfill sensor acts as a backup for the stop refill sensor, and will activate an alarm in the case of an overfill condition. It will be understood that with the quartz ampule, the stop refill and the overfill sensors are operable to signal the system controller when the emitter beam is deflected by passing through the liquid chemical, while the start refill sensor is operable to signal the system controller when the emitter beam is not deflected by passing through the liquid chemical.

When ampule 4 is stainless steel, the chemical level is preferably sensed by means of a series of probes which are denoted generally by numeral 31, and which are inserted into the top of the ampule and extend into the ampule to the area where the chemical level is to be sensed. Each probe preferably consists of a quartz rod with a beveled end. Signal beam emitter/receiver components 47 are mounted on the top of each rod and send a signal beam down through each rod. The signal beams are reflected internally by the beveled ends of the rods when the chemical liquid level is below the ends of the rods. When the beveled end of a rod is immersed in the liquid chemical, the signal beam will be refracted out of the beveled end of the rod into the chemical, and will be scattered throughout the chemical. Thus, when the beveled end of a start-refill rod 49 is immersed in the chemical, its emitter/receiver 47 will not detect the light beam and will not activate the start-refill program. There are three chemical liquid level sensor probes, one 49 for detecting the start-refill level, one 51 for detecting the full level, and one 53 for detecting an overfill level. Emitter/receivers 47 are connected to a sensor circuit or control electronics which are contained in the temperature controller. The control electronics are connected to the system controller via line, the controller being housed in a cabinet which also contains the purge gas and chemical supply manifolds and valves, and the bulk chemical supply tanks.

The controller microprocessor is a preprogrammed microprocessor that has inputted therein operating parameters for the system, and which is operable to moderate and control the various hardware components of the system so as to maintain proper chemical fill level in reservoir ampule 4; proper operation of the various valves in the system; as well as additional scheduled proper operating parameters, as will be pointed out hereinafter.

The cabinet includes a microprocessor controller section which includes a keyboard and a monitor which are contained in the electrical section of the cabinet, which cabinet section houses the electrical components of the system. A programmable logic controller (PLC) can also be used to operate the controller. With use of a PLC, the subject invention does not require an ADAC Board, and controls a touch screen flat panel display. Using a touch screen flat panel display obviates the need for a keyboard, mouse, disk drive, and internal hard drive. The lower portion of the cabinet contains the two bulk chemical supply tanks 50 and 52 and has a pair of side-by-side doors which allow access to the bulk supply tanks. The lower portion of the cabinet contains all of the aforesaid chemical and operating fluid flow control manifold and valves. The valves are preferably pneumatic valves which are operated by a source of pressurized air that is located externally of the cabinet and is connected to the manifold system via a transfer line. Control of compressed air flow through a line is accomplished via electrical solenoid valves contained in the electrical section. The sources of pressurized gas are located externally of the cabinet.

The cabinet has electrical and chemical sections which are used to operate the system. The upper electrical section of the system includes the controller computer CPU components such as the monitor, the keyboard, a mouse, a floppy disc drive, and a hard drive; or in the alternative, the touch screen flat panel display. The controller is connected to an analog to digital controller board which takes the analog signals from an interface board that controls the operation of the solenoid valves in valve manifold, and converts the analog signals into digital signals for the controller computer. The interface board is also connected to and receives signals from both of the bulk tank scales or weight sensors; from the ampule fill level sensors via a line; and from the pressure gauges P1 and P2. The solenoid valve manifold receives compressed air from the line and selectively delivers the compressed air to the above-described pneumatic valves contained in the manifold assembly via individual tubular connections. Thus, one solenoid valve is operably paired with a respective one of the pneumatic valves in the manifold. Depending on input received from start/stop signals, the weight scales and the pressure gauges, as well as operator input from the keyboard or mouse, the controller dictates operation of the solenoid valves in manifold, and, therefore, the pneumatic valves V1–V15 in manifold. The controller will also signal and prompt the system operator via the monitor as to tasks which must be manually performed.

Figure 2:
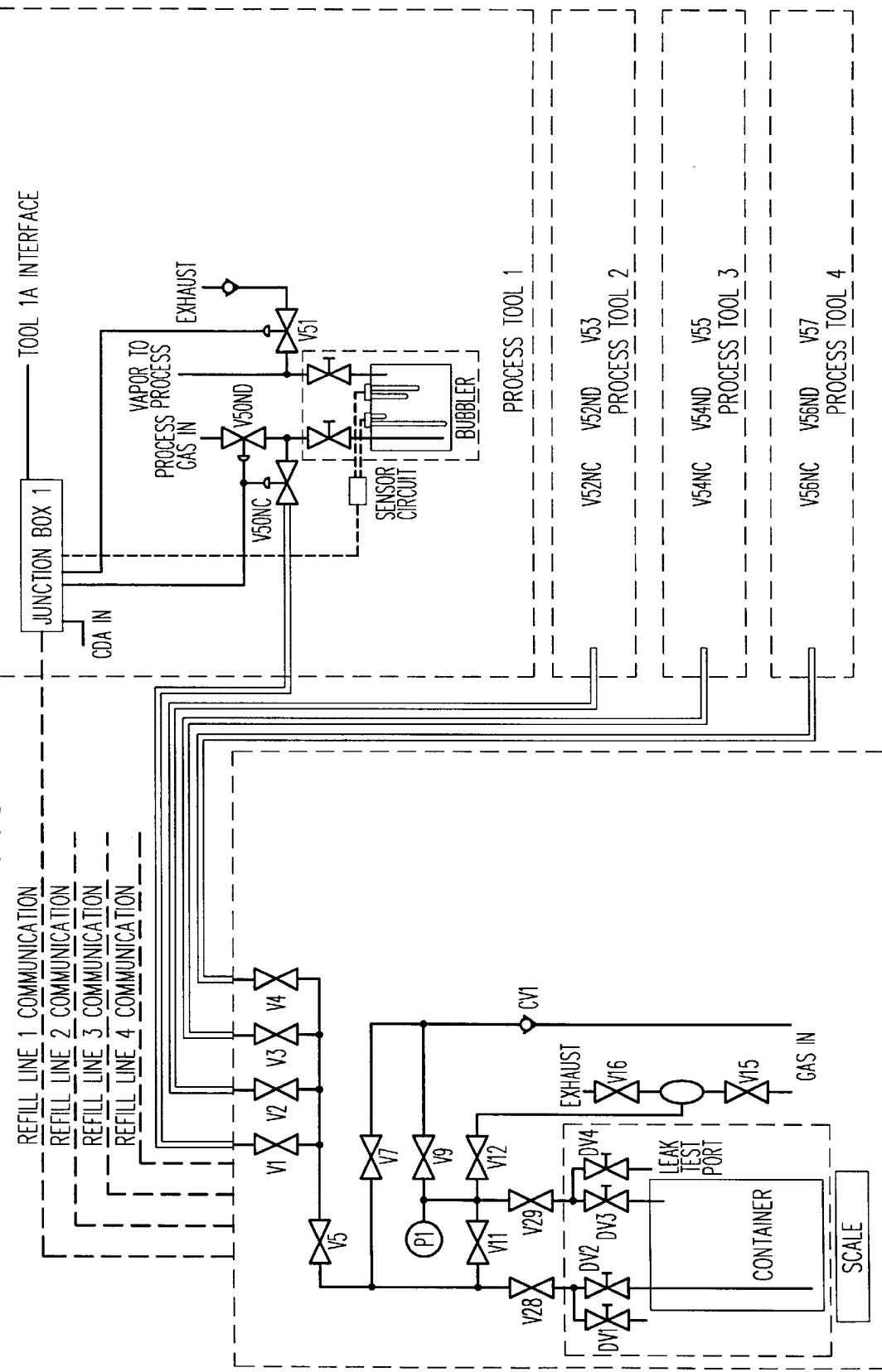
FIG. 2 is a schematic view of the system of the present invention for dispensing ultra high purity or contamination sensitive chemicals into a processing station in the production line having four points of use in the bubbler section.

It will be readily appreciated that the same system manifolding containing identical electrical and chemical components when constructed in accordance with this invention will be able to operate in either of two different modes. The only difference will be the operating program contained in a hard drive in the controller computer. Thus a system constructed in accordance with this invention will be usable in a preexisting processing plant which uses either the fixed/shuttle or shuttle/shuttle operating mode. Also, the presence of CV1 and CV2 allows for use of only one bulk supply container, such that a second container is not necessary. The modular automatic refill system is very flexible and permits connection and control of any desired number of bubblers by adjusting the number of modules in the modularly expandable automatic refill system. The increased versatility of the system of this invention will eliminate the need for custom manifolding in a chemical delivery assembly which manifolding is dependent upon the mode of operation of the processing plant. FIG. 2 shows a schematic view of an ultra pure or contamination sensitive chemical dispensing system which has only a single pressurized bulk chemical supply tank and a single chemical supply ampule.

Figure 3:
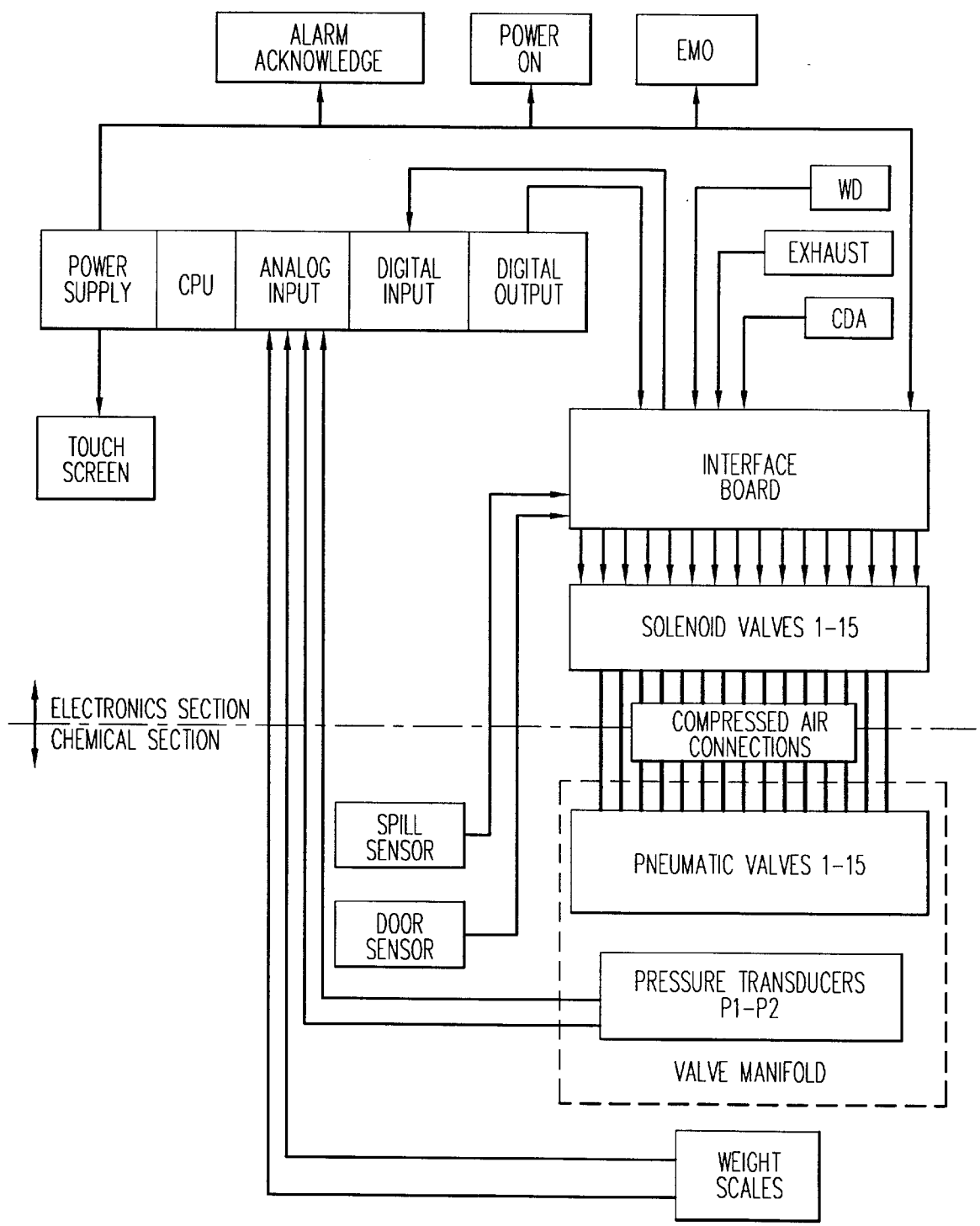
FIG. 3 is a block diagram of the electrical and chemical sections in the cabinet according to the present invention.

FIG. 3 is a block diagram of the electrical and chemical sections in the cabinet which are used to operate the system. The upper electrical section of the system includes a programmable logic controller (PLC). The PLC controller contains the CPU, analog inputs, digital inputs and outputs, and power supply. The controller is connected to an analog input which takes the signals directly from the volume or weight scales and pressure transducers (P1 and P2). The analog signals are converted into digital signals for the controller computer which controls the operation of the solenoid valves in valve manifold 114. The PLC modules connect to the interface board. The interface board contains the required power supplies and interface electronics. Pressure transducer and scales are connected to the analog card of the PLC. The vacuum switch, spill sensor and door sensor inputs are connected to the interface board. The interface electronics also interprets the signals coming from the associated processing equipment. On command from the PLC, the interface board sends signals to a bank of solenoid valves. The solenoid valves control compressed air flow to the pneumatic valves in the plumbing manifold. The solenoid valve manifold 114 receives compressed air and selectively delivers the compressed air to the above-described pneumatic valves contained in the manifold assembly 58 via individual tubular connections 116. Thus, one solenoid valve is operably paired with a respective one of the pneumatic valves in the manifold 58. Depending on input received from start/stop signals, the weight scales and the pressure gauges, as well as operator input from the keyboard or mouse, the controller dictates operation of the solenoid valves in manifold 114, and, therefore, the pneumatic valves V1-V15 in manifold 58. The controller will also signal and prompt the system operator via the touch screen monitor as to tasks which must be manually performed.

It will be readily appreciated that the same system manifolding containing identical electrical and chemical components when constructed in accordance with this invention will be able to operate in either of two different modes. The only difference will be the operating program in the controller computer. Thus a system constructed in accordance with this invention will be usable in a preexisting processing plant which uses either the fixed/shuttle or shuttle/shuttle operating mode. The increased versatility of the system of this invention will eliminate the need for custom manifolding in a chemical delivery assembly which manifolding is dependent upon the mode of operation of the processing plant.

The present invention provides a modular automatic refill system which does not require a vacuum pump but is safe for an ultra high purity, pyrophoric metalorganic (PMO) chemicals. This system also does not require the removal of the working cylinder (bubbler) from the working apparatus and controls the plurality of chemical receiving bubblers independently of one another. The system also has separate control modules for each bubbler which may be removed from the automatic refill system during operation of the remaining modules without damaging or harming the microprocessor of the removed module. Another feature of the present invention is that the automatic refill system can be utilized to fill more than one bubbler with the ultra high purity chemical from a single bulk container.

The degree of saturation of the carrier gas by the liquid chemical replenished by the subject automatic refill system does not change. Other inert carrier gases do not dilute the commonly used hydrogen carrier gas.

Also, for the present system every digital input/output is galvanically isolated from the microprocessor. All of the modules are separate, stand-alone units with their own microprocessor and peripheral electronics. When one module controlling one bubbler malfunctions, the remaining modules and bubbler controllers continue to work normally.

The replacement of a malfunctioning module or bubbler does not interfere with the operation of the remaining modules, bubblers, and their associated metalorganic chemical vapor deposition (MOCVD) machines. The separate modules are quickly and easily replaced since they are designed as pull out/plug in units. Each microprocessor control module causes its bulk chemical transfer line to be drained of PMO chemical into its corresponding working container, and thereby reducing the risk of PMO fire. The chemical transfer lines are back-filled between filling modes, with ultra-high purity hydrogen gas. Working containers or bulk chemical supply tanks are fitted with redundant level detectors, so arranged to signal extreme level conditions. A gas venturi is used to eliminate PMO vapors from transfer lines prior to a change-out of the bulk chemical supply container.

This modular automatic refill system does not upset the temperature of the liquid chemical in the receiving bubbler and, therefore, the saturation level of the exiting gas is not significantly disturbed. Also, the bulk containers are outfitted to allow the use of a helium leak detector. In this way the system can avoid atmospheric contamination, maintaining product purity after the change-out of a bulk cylinder. There is no need to remove the ultra high purity PMO chemical bubblers from the liquid temperature baths of the MOCVD machine to refill them with the chemical, nor is there a necessity to install new bubblers in their place so that the operation of the corresponding MOCVD machines is not affected during the automatic refilling operation and so that the chance of accidental fires is sharply reduced.

Additionally, the PMO transfer lines are cleared of PMO liquid chemical during the normal operating mode of the MOCVD machine between refilling modes of operation of the refill system; and that hydrogen gas is back-filled into the transfer lines between refilling modes and the MOCVD machine's operating carrier gas is otherwise undisturbed. That back-diffusion of air into the manifold during standby mode of the refill system is eliminated, and metal oxide formation in and contingent to the manifold is avoided. A venturi coupled to valve V16 is employed to remove hazardous PMO chemical vapors from transfer lines before effecting bulk cylinder change-outs.

These and other objects, features and advantages are obtained by a modular automatic chemical refill system which permits fast and easy replacement of damaged or malfunctioning modules within the automatic refill system, without affecting the operation of the remaining modules; so that any of a plurality of bubblers in the system can continue to operate and supply chemical from the bubblers to the corresponding MOCVD machines without interruption. The modular automatic refill system senses the level of liquid chemical in each bubbler and automatically refills the liquid chemical in the bubblers to an operating level without requiring removal of the bubblers from their corresponding liquid temperature baths or without significantly affecting the temperature, gas composition and liquid PMO chemical saturation level of the carrier gas, nor introducing any oxygen into the refill system or the MOCVD machine.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A chemical refill system which comprises:
   (a) at least one first liquid chemical reservoir;
   (b) at least one second liquid chemical reservoir;
   (c) a means for supplying a carrier gas to said chemical refill system;
   (d) a conduit means for connecting said means for supplying said carrier gas, said first liquid chemical reservoir, and said second liquid chemical reservoir;
   (e) at least one venturi comprising a gas inlet, a gas outlet and an exhaust gas outlet, said venturi being disposed between said means for supplying said carrier gas and said first and second liquid chemical reservoirs; and
   (f) at least one valve disposed about said exhaust outlet, wherein said valve prevents diffusion of oxygen or any contaminants into said system.

2. The chemical refill system as recited in claim 1, wherein said first chemical reservoir is a bulk chemical supply tank.

3. The chemical refill system as recited in claim 1, wherein said second chemical reservoir is an ampule and receives chemical from said first chemical reservoir and delivers chemical to a means for applying said chemical.

4. The chemical refill system as recited in claim 1, wherein said conduit means connects said chemical refill system to a means for applying said chemical.

5. The chemical refill system as recited in claim 1, wherein said conduit means comprises a plurality of transfer lines and a plurality of valves.

6. The chemical refill system as recited in claim 1, wherein said chemical refill system further comprises a volume sensor which is capable of monitoring the volume of chemicals remaining in said first and second chemical reservoir.

7. The chemical refill system as recited in claim 6, wherein said volume sensor is at least one selected from the group consisting of: optical sensor, thermal conductance sensor, capacitance sensor, weight scale, sonic sensor, scale, and nitrogen back pressure sensor.

8. The chemical refill system as recited in claim 7, wherein said volume sensor is an optical sensor utilizing a glass rod encased in said first and second chemical reservoirs.

9. The chemical refill system as recited in claim 7, wherein said volume sensor is a thermal conductance sensor utilizing a thermistor encased in said first and second chemical reservoirs.

10. The chemical refill system of claim 1, wherein each of said first and second chemical reservoirs further comprises a liquid temperature sensor.

11. The chemical refill system as recited in claim 1, wherein said chemical refill system further comprises a microprocessor controller means for selectively operating said chemical refill system.

12. The chemical refill system as recited in claim 11, wherein said microprocessor controller means is a programmable logic controller.

13. The chemical refill system as recited in claim 1, wherein said chemical refill system comprises two said first chemical reservoirs and two said second chemical reservoirs.

14. The chemical refill system as recited in claim 13, further comprising at least two check valves, wherein said check valves control said conduit means between each of said first chemical reservoirs.

15. The chemical refill system as recited in claim 13, wherein said chemical refill system further comprises a microprocessor controller means which selectively operates said system in a fixed/shuttle mode which mode involves the use of a fixed first chemical reservoir and the use of a shuttle first chemical reservoir, or in a shuttle/shuttle mode which mode involves the use of a plurality of shuttle first chemical reservoirs.

16. The chemical refill system as recited in claim 1, wherein said chemical is a pyrophoric chemical.

17. The chemical refill system as recited in claim 16, wherein said chemical is a liquid pyrophoric metalorganic chemical.

18. A process for transporting a chemical:
  (a) using a chemical refill system as recited in claim 1, further comprising a microprocessor controller means which comprises a plurality of independently operating microprocessor-controlled modules, each module being matched electrically to each first chemical reservoir, and programmed to control the refilling operation of said corresponding first chemical reservoir;
  (b) monitoring the volume of chemical within said corresponding first chemical reservoir;
  wherein each independently operating microprocessor-controlled module may be removed from the microprocessor controller without interrupting the operation of the remaining microprocessor-controlled modules and their corresponding first chemical reservoirs and wherein each microprocessor-controlled module;
  (c) sensing an alarm condition from a volume sensor; and
  (d) causing through the sensing of step (c) either a refill of that working reservoir or a shut down of that automatic refill line, and wherein all microprocessor-controlled modules, upon sensing a low level or low pressure alarm condition from said sensor in the first chemical reservoir, will act synchronously to cease operation from that first chemical reservoir.

19. A method of transporting a liquid chemical comprising the steps of:
  (a) providing the chemical refill system of claim 1;
  (b) pressurizing said at least one first liquid chemical reservoir with said carrier gas; and
  (c) forcing, under pressure, a liquid chemical contained in said at least one first liquid chemical reservoir through said conduit means thereby filling said at least one second liquid chemical reservoir with said liquid chemical.

* * * * *